United States Patent Office 2,734,410
Patented Feb. 14, 1956

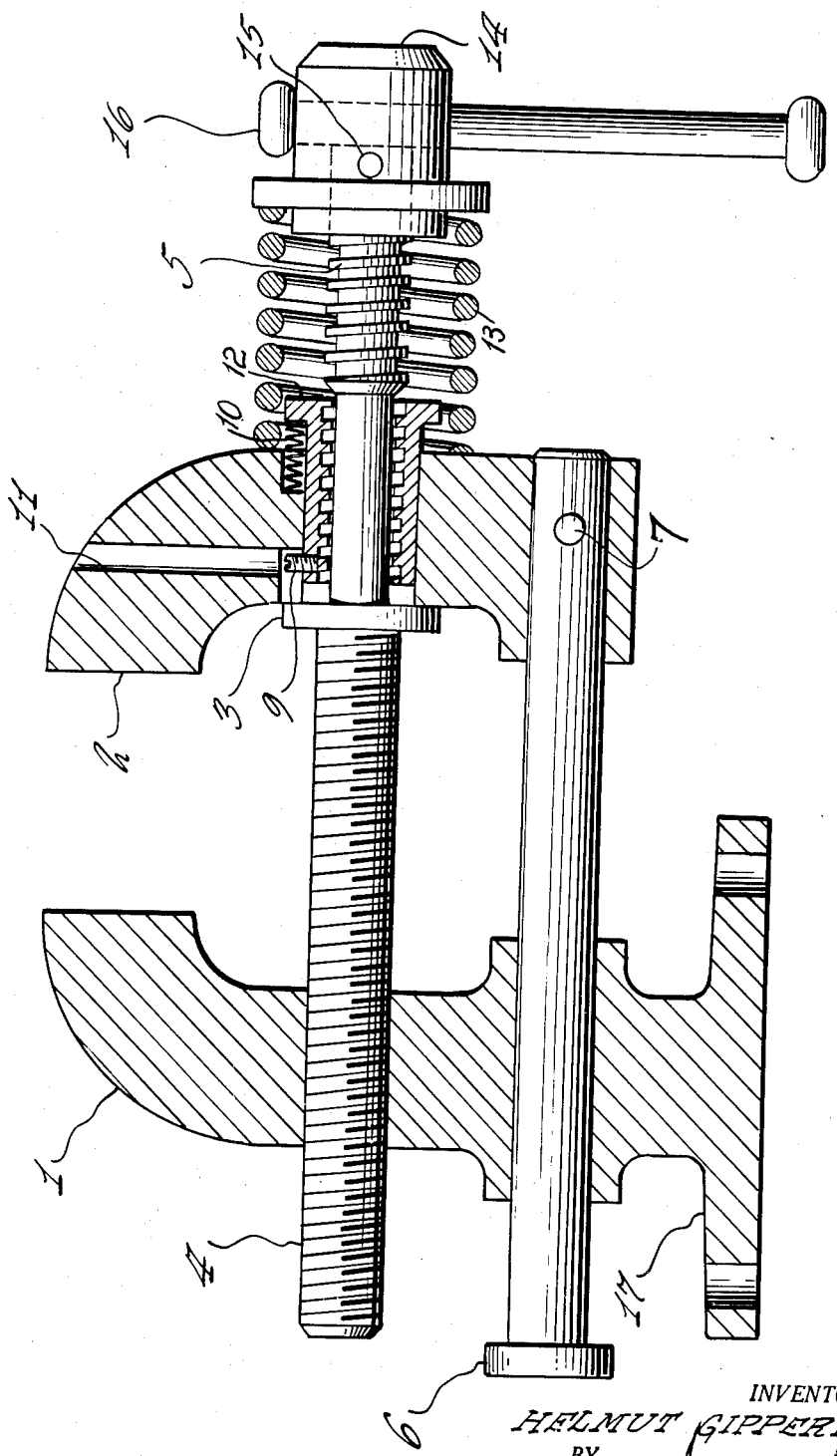

2,734,410

VISE ACTUATED BY DIFFERENTIAL SCREW

Helmut Gipperich, Kirchhundem, Kreis Olpe, Germany

Application December 6, 1954, Serial No. 473,361

Claims priority, application Germany December 7, 1953

5 Claims. (Cl. 81—33)

The present invention relates to quick-action vises, of the kind in which the jaws are relatively movable by means of a screw spindle provided with two threads of different pitches.

In known vises of this kind the spindle can be screwed into one jaw by means of one of its threads, usually by thread with the coarser pitch. The rapid adjustment of the movable jaw is effected by using the thread of coarser pitch while the final clamping is effected by using only the thread of finer pitch.

The object of the invention is to provide a vise in which only the thread of coarser pitch is used for rapid adjustment but for the final clamping both the threads of coarser and finer pitch are used, simultaneously acting on the jaws differentially so that very great clamping forces may be produced.

According to the invention, in a quick-action vise, the clamping jaws are relatively movable by means of a screw spindle which has two threads of different pitches and is threaded into one of the clamping jaws, wherein the screw spindle has a threadless portion which, when the jaws are open, extends through an internally threaded bush in the other jaw, which bush is not rotatable but is axially displaceable to a limited extent against spring action towards the first-mentioned jaw, and the second thread on the screw spindle is engageable with the internal thread of the bush but is disengaged therefrom when the jaws are opened, and one of the jaws is urged towards the other by means of a spring, the movement being limited by a stop on the spindle, the second thread on the spindle coming into engagement with the thread of the bush when the spindle is rotated to close the jaws.

Preferably the displacement of the internally threaded bush in the second clamping jaw is limited in the clamping direction by a flange or collar provided on said bush and in the opposite direction by a pin or the like inserted radially in said bush and engaging in a notch or groove in the clamping jaw. A space-saving arrangement of the spring urging the clamping jaws together and, at the same time, one which protects the second thread of the spindle against damage, is obtained if the vise according to the invention is so designed that the spring is of helical form surrounding the spindle coaxially and is arranged between the second clamping jaw and the head of the screw spindle.

An embodiment of the invention is described, by way of example with reference to the accompanying drawing which shows a quick-action vise which has clamping jaws 1 and 2. The clamping jaw 1 is designed as a stationary clamping jaw and provided with a foot or base 17. In a bore in the clamping jaw 1 there is displaceably supported a guide rod 6, which is secured in a corresponding bore in the clamping jaw 2 by means of a pin 7 inserted transversely therein. In this way, the clamping jaw 2 is so guided that its clamping surface is disposed parallel to the clamping surface of the jaw 1 in all positions.

The thread 4 of coarse pitch of a screw spindle 4, 5 is screwed into a threaded bore in the clamping jaw 1. At the end of the threaded portion 4, the spindle comprises a flange-like stop 3. Following thereon, the spindle has a threadless portion by which it is passed through a bore in the clamping jaw 2. The part of the spindle projecting to the outside is provided with a thread 5 of finer pitch. A head 14 is screwed on to the threaded part 5 of the spindle and is secured on the spindle by means of a pin 15. A grip bar 16 is arranged to be longitudinally displaceable in known manner in the head 14.

A threaded bush 8 is inserted in said bore in the clamping jaw 2 so as to be axially displaceable therein, the internal thread of said bush corresponding to the thread 5 of the spindle. The threaded bush 8 has a flange-like stop or abutment 12 and is secured against rotation by a pin 9 inserted radially in said bush and engaging in a groove in the clamping jaw 2. A compression spring 10 inserted in a recess in the clamping jaw 2 and acting on the flange 12 seeks to displace the threaded bush 8 to the right until the pin 9 abuts against the end of the guide groove.

Between the clamping jaw 2 and the head 14 of the screw spindle is arranged a coil compression spring 13 surrounding the spindle coaxially, which spring tends to displace the jaw 2 in the direction of the clamping jaw 1 and normally holds the jaw 2 resting against the flange 3 of the screw spindle.

The assembly of the quick-action vise described is carried out in the following manner: The threaded end of the screw spindle 4, 5 is screwed into the threaded bore in the clamping jaw 1 and the guide rod 6 is pushed through the bore in the clamping jaw 1 from the left. The clamping jaw 2 is then pushed over the threaded end 5 of the spindle until it abuts against the flange 3 of the spindle. The guide rod 6 is thereupon inserted into the bore in the clamping jaw 2 and connected to the latter by means of the pin 7. The threaded bush 8 is now screwed on to and beyond the thread 5 of the spindle and pushed into the bore in the clamping jaw 2, the spring 10 being also inserted in the recess in the jaw 2. The pin 9 is then screwed in through the bore 11 in the clamping jaw 2 and the threaded bush 8 is thus secured in position. The coil spring 13 is thereupon pushed over the spindle and the spindle head 14 screwed on to the thread 5 of the spindle and fixed on the spindle by means of the pin 15.

The mode of operation of the vise according to the invention is as follows: The thread 5 of the spindle is normally out of engagement with the threaded bush 8. If, therefore, the spindle is turned by means of the grip bar 16, it is screwed within the clamping jaw 1 by means of its steeper thread 4. During the axial displacement of the spindle occurring as a result of the screwing operation, the clamping jaw 2 is carried along by said spindle owing to the compression spring 13 arranged between the spindle head 14 and the clamping jaw 2. The adjustment of the clamping jaw 2 is therefore effected at a speed corresponding to the pitch of the thread 4.

Now, when the clamping jaw 2 encounters the body to be clamped, it is stopped against the force of the spring 13. The spindle 4, 5 is therefore displaced during its further rotation axially in relation to the clamping jaw 2 and the threaded bush 8 arranged therein. The thread 5 of finer pitch of the screw spindle then comes into engagement with the threaded bush 8 and is screwed into the latter. As the threads 4 and 5 have different pitches, the threaded bush 8 is displaced at the same time during the screwing in of the threaded part 5 in the axial direction towards the left. The speed of this displacement is dependent upon the difference in pitch of the two threads. If, for example, the thread 4 has a pitch of 12 mm. per turn and the thread 5 a pitch of 10 mm.

per turn, the threaded bush 8 is displaced to the left by two millimeters during one revolution of the screw spindle. By the choice of other thread pitches, the displacement can also take place still more slowly.

On further rotation of the screw spindle 4, 5, the flange 12 of the threaded bush 8 finally abuts against the clamping jaw 2. The threaded bush 8 therefore now seeks to carry the clamping jaw 2 along and presses it firmly against the body to be clamped. Owing to the differential effect of the two threads 4, 5, a very great clamping pressure can be exerted on the workpiece.

When the vise is being opened, the processes described take place in reverse sequence. On turning the spindle back, the pressure exerted on the clamping jaw 2 is first relaxed so that the spring 10 can press the flange 12 of the threaded bush 8 away from the clamping jaw 2. The threaded bush 8 thus moves to the right until the pin 9 limits its displacement. The thread 5 next comes out of engagement with the threaded bush 8 and, finally, the flange 3 of the screw spindle is applied against the clamping jaw 2 and moves it back out of its clamping position. This rearward displacement takes place at high speed, since, again, only the thread 4 is operative.

For carrying the invention into effect, it is of no importance which of the two clamping jaws is constructed as a stationary jaw. In addition, as regards the essence of the invention, the manner in which the parallel guiding of the movable clamping jaw is achieved is of secondary importance. Any other desired parallel guiding arrangement can be provided instead of the guide rod 6.

I claim:

1. A quick-acting vise comprising a pair of relatively movable jaws, a threaded aperture in one of said jaws, an internally threaded bush axially displaceable to a limited extent in the other of said jaws, means for preventing rotation of said bush in said other jaw, spring means opposing axial movement of said bush towards said one jaw, a rotatable spindle, said spindle having a threaded portion threaded into said threaded aperture, an unthreaded portion passing through said bush and a second threaded portion normally disposed outside said bush but engageable with the internal thread thereof, spring means urging said other jaw towards said one jaw, a stop on said spindle by which movement of said other jaw by said spring means is limited, and means for rotating said spindle, the pitches of the threads of said threaded portions of the spindle being different.

2. A vise as claimed in claim 1, in which the means for limiting the axial displacement of the bush in one sense comprises a flange on said bush, and in the other sense comprises a pin extending radially from said bush, and a groove in said other jaw in which said pin engages.

3. A vise as claimed in claim 1, in which the said spring means urging said other jaw is a coiled compression spring which surrounds said spindle co-axially.

4. A quick-acting vise comprising a pair of relatively movable jaws, a threaded aperture in one of said jaws, an internally threaded bush disposed in an aperture in said other jaw, said bush being axially displaceable towards and away from said one jaw, means for limiting axial movement of said bush in both senses, spring means opposing axial movement of said bush towards said one jaw, a rotatable spindle, a thread on said spindle threaded into said threaded aperture, an unthreaded portion on said spindle extending through said bush when said jaws are open, a further thread on said spindle, said further thread being engageable with the internal thread of said bush when the jaws are closed but being disengaged therefrom when the jaws are open, spring means urging said other jaw towards said one jaw, a stop on said spindle by which movement of said other jaw by said spring means is limited, and means for rotating said spindle, the pitches of the threads of said threaded portions of the spindle being different.

5. A quick-acting vise comprising a pair of relatively movable jaws, a threaded aperture in one of said jaws, an internally threaded bush axially displaceable to a limited extent in the other of said jaws, means for preventing rotation of said bush in said other jaw, spring means opposing axial movement of said bush towards said one jaw, a rotatable spindle, said spindle having a threaded portion threaded into said threaded aperture, an unthreaded portion passing through said bush and a second threaded portion normally disposed outside said bush but engageable with the internal thread thereof, spring means urging said other jaw towards said one jaw, a stop on said spindle by which movement of said other jaw by said spring means is limited, means for rotating said spindle, the pitches of the threads of said threaded portions of the spindle being different, means for fixing one of said jaws and means for guiding said other jaw for movement towards and away from said fixed jaw.

References Cited in the file of this patent

UNITED STATES PATENTS

| | | |
|---|---|---|
| 250,464 | Thompson | Dec. 6, 1881 |
| 2,148,800 | Billings | Feb. 28, 1939 |